(12) United States Patent
Choi et al.

(10) Patent No.: US 12,711,200 B2
(45) Date of Patent: Aug. 18, 2026

(54) ARTIFICIAL INTELLIGENCE APPARATUS AND METHOD FOR ESTIMATING SOUND SOURCE LOCALIZATION THEREOF

(71) Applicant: LG ELECTRONICS INC., Seoul (KR)

(72) Inventors: Hyeonsik Choi, Seoul (KR); Sungmoon Cho, Seoul (KR); Sangjun Oh, Seoul (KR); Jaepil Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 864 days.

(21) Appl. No.: 18/062,483

(22) Filed: Dec. 6, 2022

(65) Prior Publication Data

US 2024/0061907 A1 Feb. 22, 2024

(30) Foreign Application Priority Data

Aug. 19, 2022 (KR) ........................ 10-2022-0103907

(51) Int. Cl.
*G06F 18/21* (2023.01)
*G01S 3/80* (2006.01)
*G06F 18/214* (2023.01)

(52) U.S. Cl.
CPC .......... *G06F 18/217* (2023.01); *G01S 3/8006* (2013.01); *G06F 18/214* (2023.01)

(58) Field of Classification Search
CPC ........ G06F 18/217; G06F 18/214; G06F 3/01; G06F 3/011; G06F 3/016; G06F 3/017;
(Continued)

(56) References Cited

U.S. PATENT DOCUMENTS 11,682,213 B2 * 6/2023 Yoon ...................... G06N 3/045 382/157
2005/0080619 A1 4/2005 Choi et al.
(Continued)

FOREIGN PATENT DOCUMENTS

CA 3157218 A1 * 10/2014 ........... H04L 67/131
KR 10-2005-0035562 4/2005
(Continued)

OTHER PUBLICATIONS

Korean Intellectual Property Office Application No. 10-2022-0103907, Office Action dated Apr. 2, 2025, 4 pages.
(Continued)

*Primary Examiner* — Mike Anderson
(74) *Attorney, Agent, or Firm* — LEE, HONG, DEGERMAN, KANG & WAIMEY

(57) ABSTRACT

An artificial intelligence (AI) apparatus including a memory and a processor configured to estimate a sound source localization based on at least one of image information, sound source information, and sensor information stored in the memory. The processor is configured to pre-process at least one of the image information, the sound source information, or the sensor information to generate test data, input the test data into a pre-trained AI model to estimate the sound source localization, calculate a sound source localization estimation evaluation score of the AI model for the test data, classify the test data into validation data based on the calculated sound source localization estimation evaluation score, change the AI model based on the classified validation data, and input the test data into the changed AI model to update the AI model.

14 Claims, 15 Drawing Sheets

(58) Field of Classification Search

CPC ... G06F 3/018; G06F 3/02; G06F 3/03; G06F 3/048; G06F 18/22; G06F 18/21; G06F 18/211; G06F 18/213; G06F 18/2163; G06F 18/2111; G06F 18/2113; G06F 18/2115; G06F 18/2131; G06F 18/2132; G06F 18/2133; G06F 18/2134; G06F 18/2135; G06F 18/2136; G06F 18/2137; G06F 18/2178; G06F 18/2193; G06F 18/2185; G06F 18/2148; G06F 18/2155; G06F 18/21375; G06F 18/21322; G06F 18/21324; G06F 18/21326; G06F 18/21328; G06F 18/21342; G06F 18/21343; G06F 18/21345; G06F 18/21347; G06F 18/21348; G06F 18/21355; G01S 3/8006

USPC .......................................................... 701/408

See application file for complete search history.

(56) References Cited

U.S. PATENT DOCUMENTS

2012/0207323 A1 8/2012 Kim
2016/0061934 A1* 3/2016 Woodruff ................ G10L 25/48 367/129
2019/0341054 A1* 11/2019 Krupka ................ G06V 10/764
2020/0042832 A1 2/2020 Kim et al.
2020/0082811 A1 3/2020 Yadav et al.
2020/0104380 A1 4/2020 Connell, II et al.
2020/0125893 A1 4/2020 Choi et al.
2021/0166084 A1 6/2021 Kim et al.
2021/0174142 A1* 6/2021 Han ....................... G06N 3/045
2021/0174534 A1 6/2021 Yi
2021/0271978 A1* 9/2021 Le Moing ............... G10L 25/51
2021/0350135 A1* 11/2021 Salamon ................. H04S 7/302
2022/0012591 A1 1/2022 Dalli et al.
2022/0247654 A1* 8/2022 Springer ............. H04L 43/0823
2023/0077816 A1* 3/2023 Du ........................... G06N 3/08 704/200

FOREIGN PATENT DOCUMENTS

KR 10-2009-0044314 5/2009
KR 1020200046188 5/2020
KR 1020200128486 11/2020
KR 1020210043703 4/2021
KR 1020210064018 6/2021

OTHER PUBLICATIONS

European Patent Office Application Serial No. 22955835.8 Search Report dated May 15, 2025, 6 pages.
Liu et al., "Self-Supervised Incremental Learning for Sound Source Localization in Complex Indoor Environment," 2019 International Conference on Robotics and Automation (ICRA), May 2019, 7 Pages.
PCT International Application No. PCT/KR2022/018269 International Search Report dated May 17, 2023, 8 pages.

* cited by examiner

| FIRST OBJECT |
| --- |
| OBJECT IMAGE DATA |
| OBJECT SOUND DATA |
| OBJECT SENSOR DATA |

1120

| SECOND OBJECT |
| --- |
| OBJECT IMAGE DATA |
| OBJECT SOUND DATA |
| OBJECT SENSOR DATA |

1130

| THIRD OBJECT |
| --- |
| OBJECT IMAGE DATA |
| OBJECT SOUND DATA |
| OBJECT SENSOR DATA |

| FIRST OBJECT |
| --- |
| OBJECT IMAGE DATA (FIRST TV) |
| OBJECT IMAGE DATA (SECOND TV) |
| OBJECT IMAGE DATA (REFRIGERATOR) |
| OBJECT SOUND DATA (FIRST TV) |
| OBJECT SOUND DATA (SECOND TV) |
| OBJECT SOUND DATA (AIR PURIFIER) |
| OBJECT SENSOR DATA (ROBOT CLEANER) |

1120

| SECOND OBJECT |
| --- |
| OBJECT IMAGE DATA (SECOND TV) |
| OBJECT SOUND DATA (SECOND TV) |
| OBJECT SENSOR DATA (AIR PURIFIER) |

1130

| THIRD OBJECT |
| --- |
| OBJECT SOUND DATA (FIRST TV) |
| OBJECT SOUND DATA (SECOND TV) |
| OBJECT SOUND DATA (AIR PURIFIER) |
| OBJECT SENSOR DATA (ROBOT CLEANER) |

ARTIFICIAL INTELLIGENCE APPARATUS AND METHOD FOR ESTIMATING SOUND SOURCE LOCALIZATION THEREOF

CROSS-REFERENCE TO RELATED APPLICATIONS

Pursuant to 35 U.S.C. § 119(a), this application claims the benefit of earlier filing date and right of priority to Korean Patent Application No. 10-2022-0103907, filed on Aug. 19, 2022, the contents of which are hereby incorporated by reference herein in its entirety.

BACKGROUND

The present disclosure relates to an artificial intelligence apparatus capable of enhancing sound source localization estimation performance in response to various environmental changes, and a method for estimating a sound source localization thereof.

In general, artificial intelligence is a field of computer engineering and information technology involving studying how computers can think, learn and self-develop in ways similar to human intelligence, and means that computers can emulate intelligent actions of humans.

In addition, artificial intelligence does not exist by itself but is directly or indirectly associated with the other fields of computer science. In particular, many attempts have been made to introduce elements of artificial intelligence into various fields of information technology.

Techniques for recognizing and learning surrounding situations by using artificial intelligence, providing information desired by the user in a desired form, or performing a desired operation or function are being studied.

Also, electronic apparatuses that provide various operations and functions may be called artificial intelligence apparatuses.

Recently, due to an increase in single-person households, remote medical services and AI care services are becoming important, and studies on sound source localization estimation technologies are being actively conducted accordingly.

Sound source localization estimation technologies are technologies for accurately estimating the location of a speaker who gives a voice command, and are used in various products such as smart speakers and robots.

However, in the existing sound source localization estimation technology, when the speaker moves, or the indoor environment changes, the sound source localization estimation performance may be deteriorated sharply, and thus, voice recognition may be impossible, and there is a limitation in speaker location tracking or speaker behavior analysis in an indoor space.

Therefore, in the future, it is necessary to develop an artificial intelligence apparatus capable of enhancing sound source localization estimation performance by continuously learning and updating the sound source localization estimation in response to various environmental changes.

SUMMARY

An object of the present disclosure is to solve the foregoing limitations and other limitations.

Embodiments of the present disclosure provide an artificial intelligence apparatus, which is capable of changing an artificial intelligence model using validation data classified based on a sound source estimation evaluation score for each test data to update the changed artificial intelligence model to the test data, thereby continuously learning and updating sound source localization estimation in response to various environmental changes and enhancing sound source localization estimation performance, and a method for estimating the sound source localization thereof.

In one embodiment, an artificial intelligence apparatus includes: a memory configured to store image information, sound source information, and sensor information; and a processor configured to estimate a sound source localization based on at least one of the image information, the sound source information, and the sensor information, wherein the processor is configured to: pre-process at least one of the image information, the sound source information, or the sensor information so as to generate test data; input the test data into a pre-trained artificial intelligence model so as to estimate the sound source localization; calculate a sound source localization estimation evaluation score of the artificial intelligence model for each test data; classify the test data into validation data based on the calculated sound source localization estimation evaluation score; change the artificial intelligence model based on the classified validation data; and input the test data into the changed artificial intelligence model so as to update the artificial intelligence model.

In another embodiment, a method for estimating a sound source localization of an artificial intelligence apparatus includes: acquiring at least one of image information, sound source information, or sensor information from a plurality of devices, which are disposed in an indoor space; pre-processing at least one of the image information, the sound source information, or the sensor information; generating test data based on the image information, the sound source information, and the sensor information, which are pre-processed; inputting the test data into a pre-trained artificial intelligence model to estimate a sound source localization; calculating a sound source localization estimation evaluation score of the artificial intelligence model for each test data; classifying the test data into validation data based on the calculated sound source localization estimation evaluation score; changing the artificial intelligence model based on the classified validation data; and inputting the test data into the changed artificial intelligence model to update the artificial intelligence model.

The details of one or more embodiments are set forth in the accompanying drawings and the description below. Other features will be apparent from the description and drawings, and from the claims.

BRIEF DESCRIPTION OF THE DRAWINGS

FIGS. 9 and 10 are views for explaining a process of generating data in the artificial intelligence apparatus according to an embodiment of the present disclosure.

DETAILED DESCRIPTION OF THE EMBODIMENTS

Figure 1:
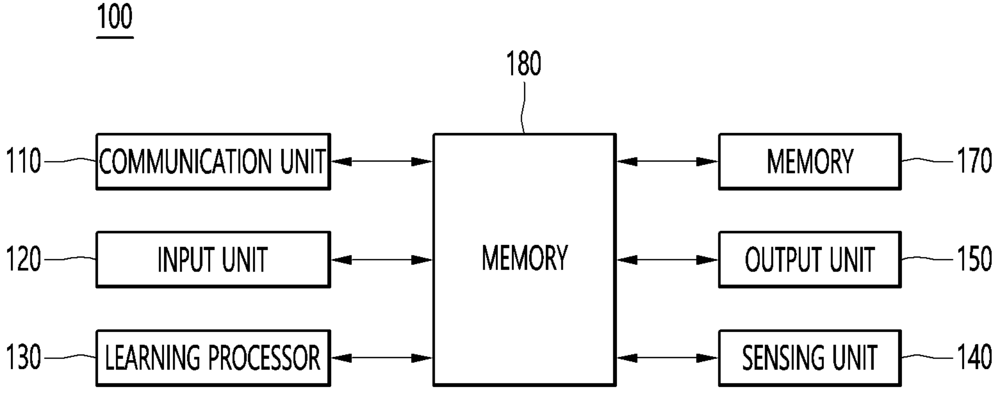
FIG. 1 illustrates an artificial intelligence apparatus according to an embodiment of the present disclosure.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the disclosure in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

Also, throughout this specification, a neural network and a network function may be used interchangeably. The neural network may be constituted by a set of interconnected computational units, which may be generally referred to as "nodes". These "nodes" may also be referred to as "neurons". The neural network is configured to include at least two or more nodes. Nodes (or neurons) constituting neural networks may be interconnected by one or more "links".

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning/training of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of training an artificial neural network in a state in which a label for learning data is given, and the label may mean the correct answer (or result value) that the artificial neural network must infer when the learning data is input to the artificial neural network. The unsupervised learning may refer to a method of training an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

Various robots may include a driving unit which may include an actuator or a motor and may perform various physical operations such as moving a robot joint. In addition, a movable robot may include a wheel, a brake, a propeller, or the like in a driving unit, and the robot may travel on the ground or fly through the air by operation of the driving unit.

<Self-Driving>

Self-driving refers to a technique of driving without or with limited user control, and a self-driving vehicle refers to a vehicle that travels without an operation of a user or with a minimum operation of a user.

For example, self-driving may include a technology for maintaining a lane while driving, a technology for automatically adjusting a speed, such as adaptive cruise control, a technique for automatically traveling along a predetermined route, a technology for automatically setting and traveling a route when a destination is set, or the like.

A vehicle may include only an internal combustion engine, a hybrid vehicle having an internal combustion engine and an electric motor together, or an electric vehicle having only an electric motor, and may also refer to not only an automobile but also a train, a motorcycle, and the like.

In this case, the self-driving vehicle may be regarded as a robot having a self-driving function.

<eXtended Reality (XR)>

Extended reality is collectively referred to as virtual reality (VR), augmented reality (AR), and mixed reality (MR).

The VR technology provides a real-world object and background only as a computer generated (CG) image, the AR technology provides a virtual CG image on a real object or background image, and the MR technology is a computer graphic technology that mixes and combines virtual objects into the real world.

The MR technology is similar to the AR technology in that the real object or background and the virtual object are illustrated together. However, in the AR technology, the virtual object is used in the form that complements the real object or background, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI device 100 according to an embodiment of the present disclosure.

The AI device (or an AI apparatus) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100*a* to 100*e* and the AI server 200 (see FIGS. 2, 3) by using wire/wireless communication technology. For example, the communication unit 110 may transmit and receive information related to sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™ RFID (Radio Frequency Identification), Infrared Data Association (IrDA), ZigBee, NFC (Near Field Communication), and the like.

The input unit 120 may acquire various kinds of data.

In this case, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used if an output is acquired by using the learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to infer a result value for new input data rather than learning data, and the inferred value may be used as a basis for a determination to perform a certain operation.

Figure 2:
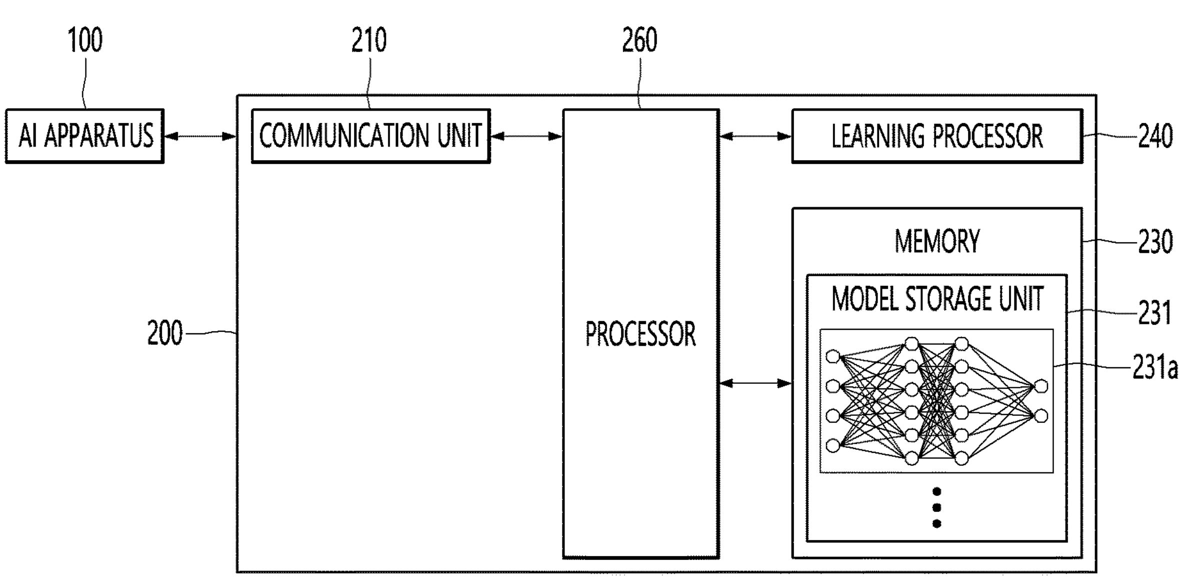
FIG. 2 illustrates an artificial intelligence server according to an embodiment of the present disclosure.

At this time, the learning processor 130 may perform AI processing together with the learning processor 240 of the AI server 200 of FIG. 2.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar, or the like.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for a user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in the memory 170. Furthermore, the processor 180 may operate two or more of the components included in the AI device 100 in combination so as to drive the application program.

FIG. 2 illustrates an AI server 200 according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing or may be defined as a 5G network. In this case, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 may transmit and receive data to and from an external device such as the AI device 100.

The memory 230 may include a model storage unit 231. The model storage unit 231 may store a learning or learned model (or an artificial neural network 231*a*) through the learning processor 240.

The learning processor 240 may learn/train the artificial neural network 231*a* by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
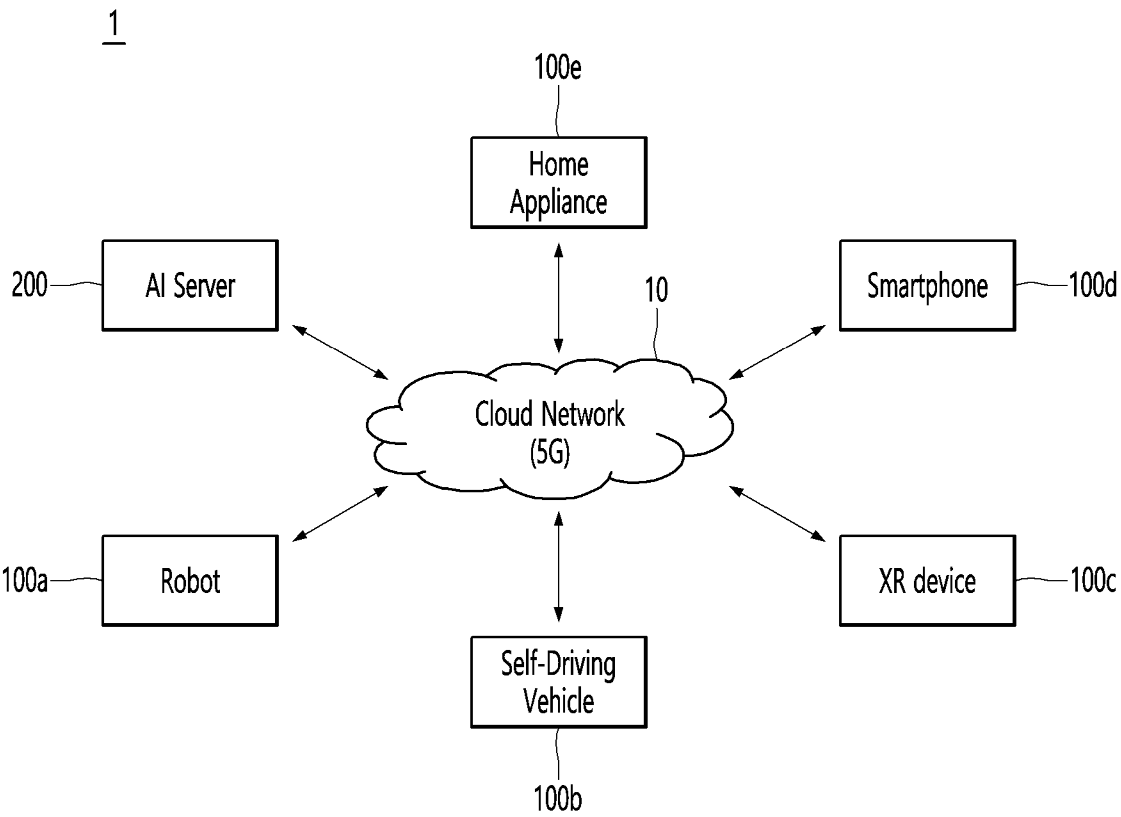
FIG. 3 illustrates an artificial intelligence system according to an embodiment of the present disclosure.

FIG. 3 is a view of an AI system 1 according to an embodiment of the present invention.

Referring to FIG. 3, in the AI system 1, at least one of an AI server 200, a robot 100*a*, a self-driving vehicle 100*b*, an XR device 100*c*, a smartphone 100*d*, or a home appliance 100*e* is connected to a cloud network 10. The robot 100*a*, the self-driving vehicle 100*b*, the XR device 100*c*, the smartphone 100*d*, or the home appliance 100*e*, to which the AI technology is applied, may be referred to as AI devices 100*a* to 100*e*.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100*a* to 100*e* and 200 configuring the AI system 1 may be connected to each other through the cloud network 10. In particular, each of the devices 100*a* to 100*e* and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100*a*, the self-driving vehicle 100*b*, the XR device 100*c*, the smartphone 100*d*, or the home appliance 100*e* through the cloud network 10, and may assist at least part of AI processing of the connected AI devices 100*a* to 100*e*.

At this time, the AI server 200 may learn the artificial neural network according to the machine learning algorithm instead of the AI devices 100*a* to 100*e*, and may directly store the learning model or transmit the learning model to the AI devices 100*a* to 100*e*.

At this time, the AI server 200 may receive input data from the AI devices 100*a* to 100*e*, may infer the result value for the accommodated input data by using the learning model, may generate a response or a control command based on the inferred result value, and may transmit the response or the control command to the AI devices 100*a* to 100*e*.

Alternatively, the AI devices 100*a* to 100*e* may infer the result value for the input data by directly using the learning model, and may generate the response or the control command based on the inference result.

Hereinafter, various embodiments of the AI devices 100*a* to 100*e* to which the above-described technology is applied will be described. The AI devices 100*a* to 100*e* illustrated in FIG. 3 may be regarded as a specific embodiment of the AI device 100 illustrated in FIG. 1.

<AI+Robot>

The robot 100*a*, to which the AI technology is applied, may be implemented as a guide robot, a carrying robot, a cleaning robot, a wearable robot, an entertainment robot, a pet robot, an unmanned flying robot, or the like.

The robot 100*a* may include a robot control module for controlling the operation, and the robot control module may refer to a software module or a chip implementing the software module by hardware.

The robot 100*a* may acquire state information about the robot 100*a* by using sensor information acquired from various kinds of sensors, may detect (recognize) surrounding environment and objects, may generate map data, may determine the route and the travel plan, may determine the response to user interaction, or may determine the operation.

The robot 100*a* may use the sensor information acquired from at least one sensor among the lidar, the radar, and the camera so as to determine the travel route and the travel plan.

The robot 100*a* may perform the above-described operations by using the learning model provided as at least one artificial neural network. For example, the robot 100*a* may recognize the surrounding environment and the objects by using the learning model, and may determine the operation by using the recognized surrounding information or object information. The learning model may be learned directly from the robot 100*a* or may be learned from an external device such as the AI server 200.

At this time, the robot 100*a* may perform the operation by generating the result by directly using the learning model, but the sensor information may be transmitted to the external device such as the AI server 200 and the generated result may be accommodated to perform the operation.

The robot 100*a* may use at least one of the map data, the object information detected from the sensor information, or the object information acquired from the external apparatus to determine the travel route and the travel plan, and may control the driving unit such that the robot 100*a* travels along the determined travel route and travel plan.

The map data may include object identification information about various objects arranged in the space in which the robot 100*a* moves. For example, the map data may include object identification information about fixed objects such as walls and doors and movable objects such as people and desks. The object identification information may include a name, a type, a distance, and a position.

In addition, the robot 100*a* may perform the operation or travel by controlling the driving unit based on the control/interaction of the user. At this time, the robot 100*a* may acquire the intention information of the interaction due to the user's operation or speech utterance, and may determine the response based on the acquired intention information, and may perform the operation.

<AI+Self-Driving>

The self-driving vehicle 100*b*, to which the AI technology is applied, may be implemented as a mobile robot, a vehicle, an unmanned flying vehicle, or the like.

The self-driving vehicle 100*b* may include a self-driving control module for controlling a self-driving function, and the self-driving control module may refer to a software module or a chip implementing the software module by hardware. The self-driving control module may be included in the self-driving vehicle 100*b* as a component thereof, but may be implemented with separate hardware and connected to the outside of the self-driving vehicle 100*b*.

The self-driving vehicle 100*b* may acquire state information about the self-driving vehicle 100*b* by using sensor information acquired from various kinds of sensors, may detect (recognize) surrounding environment and objects, may generate map data, may determine the path and the travel plan, or may determine the operation.

Like the robot 100*a*, the self-driving vehicle 100*b* may use the sensor information acquired from at least one sensor among the lidar, the radar, and the camera so as to determine the travel path and the travel plan.

In particular, the self-driving vehicle 100*b* may recognize the environment or objects for an area covered by a field of view or an area over a certain distance by receiving the sensor information from external devices, or may receive directly recognized information from the external devices.

The self-driving vehicle 100*b* may perform the above-described operations by using the learning model composed of at least one artificial neural network. For example, the self-driving vehicle 100*b* may recognize the surrounding environment and the objects by using the learning model, and may determine the traveling movement line by using the recognized surrounding information or object information. The learning model may be learned directly from the self-driving vehicle 100*a* or may be learned from an external device such as the AI server 200.

In this case, the self-driving vehicle 100*b* may perform the operation by generating the result by directly using the learning model, but the sensor information may be transmitted to the external device such as the AI server 200 and the generated result may be received to perform the operation.

The self-driving vehicle 100*b* may use at least one of the map data, the object information detected from the sensor information, or the object information acquired from the external apparatus to determine the travel path and the travel plan, and may control the driving device such that the self-driving vehicle 100*b* travels along the determined travel path and travel plan.

The map data may include object identification information about various objects arranged in the space (for example, a road) in which the self-driving vehicle 100*b* travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100*b* may perform the operation or travel by controlling the driving device based on the control/interaction of the user. In this case, the self-driving vehicle 100*b* may acquire the intention information of the interaction due to the user's operation or speech utterance, and may determine the response based on the acquired intention information, and may perform the operation.

<AI+XR>

The XR device 100*c*, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100*c* may analyze three-dimensional point cloud data or image data acquired from various sensors or the external devices, generate position data and attribute data for the three-dimensional points, acquire information about the surrounding space or the real object, and render the XR object to be output. For example, the XR device 100*c* may output an XR object including the additional information about the recognized object in correspondence to the recognized object.

The XR device 100*c* may perform the above-described operations by using the learning model composed of at least one artificial neural network. For example, the XR device 100*c* may recognize the real object from the three-dimensional point cloud data or the image data by using the learning model, and may provide information corresponding to the recognized real object. The learning model may be directly learned from the XR device 100*c*, or may be learned from the external device such as the AI server 200.

In this case, the XR device 100*c* may perform the operation by generating the result by directly using the learning model, but the sensor information may be transmitted to the external device such as the AI server 200 and the generated result may be received to perform the operation.

<AI+Robot+Self-Driving>

The robot 100*a*, to which the AI technology and the self-driving technology are applied, may be implemented as a guide robot, a carrying robot, a cleaning robot, a wearable robot, an entertainment robot, a pet robot, an unmanned flying robot, or the like.

The robot 100*a*, to which the AI technology and the self-driving technology are applied, may refer to the robot itself having the self-driving function or the robot 100*a* interacting with the self-driving vehicle 100*b*.

The robot 100*a* having the self-driving function may collectively refer to a device that moves for itself along the given movement line without the user's control or moves for itself by determining the movement line by itself.

The robot 100*a* and the self-driving vehicle 100*b* having the self-driving function may use a common sensing method so as to determine at least one of the travel route or the travel plan. For example, the robot 100*a* and the self-driving vehicle 100*b* having the self-driving function may determine at least one of the travel route or the travel plan by using the information sensed through the lidar, the radar, or the camera.

The robot 100*a* that interacts with the self-driving vehicle 100*b* exists separately from the self-driving vehicle 100*b* and may perform operations interworking with the self-driving function of the self-driving vehicle 100*b* or interworking with the user who rides on the self-driving vehicle 100*b*.

At this time, the robot 100*a* interacting with the self-driving vehicle 100*b* may control or assist the self-driving function of the self-driving vehicle 100*b* by acquiring sensor information on behalf of the self-driving vehicle 100*b* and providing the sensor information to the self-driving vehicle 100*b*, or by acquiring sensor information, generating environment information or object information, and providing the information to the self-driving vehicle 100*b*.

Alternatively, the robot 100*a* interacting with the self-driving vehicle 100*b* may monitor the user boarding the self-driving vehicle 100*b*, or may control the function of the self-driving vehicle 100*b* through the interaction with the user. For example, when it is determined that the driver is in a drowsy state, the robot 100*a* may activate the self-driving function of the self-driving vehicle 100*b* or assist the control of the driving unit of the self-driving vehicle 100*b*. The function of the self-driving vehicle 100*b* controlled by the robot 100*a* may include not only the self-driving function but also the function provided by the navigation system or the audio system provided in the self-driving vehicle 100*b*.

Alternatively, the robot 100*a* that interacts with the self-driving vehicle 100*b* may provide information or assist the function to the self-driving vehicle 100*b* outside the self-driving vehicle 100*b*. For example, the robot 100*a* may provide traffic information including signal information and the like, such as a smart signal, to the self-driving vehicle 100*b*, and automatically connect an electric charger to a charging port by interacting with the self-driving vehicle 100*b* like an automatic electric charger of an electric vehicle.

<AI+Robot+XR>

The robot 100*a*, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100*a*, to which the XR technology is applied, may refer to a robot subjected to control/interaction in an XR image. In this case, the robot 100*a* may be separated from the XR device 100*c* and interwork with each other.

If the robot 100*a*, which is subjected to control/interaction in the XR image, may acquire the sensor information from the sensors including the camera, the robot 100*a* or the XR device 100*c* may generate the XR image based on the sensor information, and the XR device 100*c* may output the generated XR image. The robot 100*a* may operate based on the control signal input through the XR device 100*c* or the user's interaction.

For example, the user may confirm the XR image corresponding to the time point of the robot 100*a* interworking remotely through the external device such as the XR device 100*c*, adjust the self-driving travel path of the robot 100*a* through interaction, control the operation or driving, or confirm the information about the surrounding object.

<AI+Self-Driving+XR>

The self-driving vehicle 100*b*, to which the AI technology and the XR technology are applied, may be implemented as a mobile robot, a vehicle, an unmanned flying vehicle, or the like.

The self-driving vehicle 100*b*, to which the XR technology is applied, may refer to a self-driving vehicle having a means for providing an XR image or a self-driving vehicle subjected to control/interaction in an XR image. Particularly, the self-driving vehicle 100*b* In other words subjected to control/interaction in the XR image may be distinguished from the XR device 100*c* and interwork with each other.

The self-driving vehicle 100*b* having the means for providing the XR image may acquire the sensor information from the sensors including the camera and output the generated XR image based on the acquired sensor information. For example, the self-driving vehicle 100*b* may include an HUD to output an XR image, thereby providing a passenger with a real object or an XR object corresponding to an object in the screen.

In this case, if the XR object is output to the HUD, at least part of the XR object may be outputted so as to overlap the actual object to which the passenger's gaze is directed. Meanwhile, if the XR object is output to the display provided in the self-driving vehicle 100*b*, at least part of the XR object may be output so as to overlap the object in the screen. For example, the self-driving vehicle 100*b* may output XR objects corresponding to objects such as a lane, another vehicle, a traffic light, a traffic sign, a two-wheeled vehicle, a pedestrian, a building, and the like.

If the self-driving vehicle 100*b*, which is subjected to control/interaction in the XR image, may acquire the sensor information from the sensors including the camera, the self-driving vehicle 100*b* or the XR device 100*c* may generate the XR image based on the sensor information, and the XR device 100*c* may output the generated XR image. The self-driving vehicle 100*b* may operate based on the user's interaction or a control signal input through the external device such as the XR device 100*c*.

Figure 4:
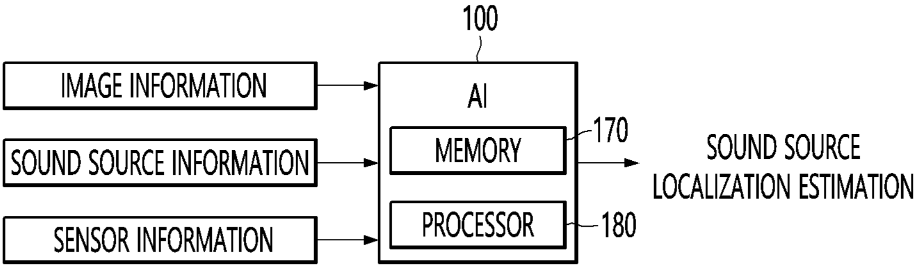
FIG. 4 is a view for explaining a processor of the artificial intelligence apparatus according to an embodiment of the present disclosure.

FIG. 4 is a view for explaining a processor of the artificial intelligence apparatus according to an embodiment of the present disclosure.

As illustrated in FIG. 4, the present disclosure may include a memory 170 storing image information, sound source information, and sensor information and a processor 180 estimating a sound source localization based on at least one of the image information, the sound source information, and the sensor information.

Here, the processor 180 may pre-process at least one of the image information, the sound source information, or the sensor information to generate test data, input the test data into a pre-trained artificial intelligence model to estimate the sound source localization, calculate a sound source localization estimation evaluation score of the artificial intelligence model for each test data, classify the test data into validation data based on the calculated sound source localization estimation evaluation score, change the artificial intelligence model based on the classified validation data, and input the test data into the changed artificial intelligence model to update the artificial intelligence model.

In addition, the processor 180 may be communicatively connected to a plurality of devices disposed in an indoor space to acquire at least one of the image information, the sound source information, or the sensor information from a plurality of devices.

For example, the plurality of devices may include at least one of a camera that acquires the image information of an object located in an indoor space, a microphone that acquires the sound source information of the object located in the indoor space, or a sensor that acquires the sensor information by sensing the object located in the indoor space.

Here, the object may include a subject or a speaker of a sound source that generates sound.

Next, when the image information, the sound source information, and the sensor information are pre-processed, the processor 180 may perform pre-processing so that a target object is classified from the image information to extract object image data, perform pre-processing so that object sound data corresponding to the target object is extracted from the sound source information, and perform pre-processing so that object sensor data corresponding to the target object is extracted from the sensor information.

Here, when the image information is pre-processed, if a target object classified from the image information is provided in plurality, the processor 180 may identify the plurality of target objects based on image information of a pre-registered object and perform pre-processing so that object image data is extracted for each target object.

In addition, when the sound source information is pre-processed, if the target object classified from the sound source information is provided in plurality, the processor 180 may identify sound with respect to a plurality of target objects from the sound source information based on the sound information of a pre-registered object and perform pre-processing so that the object sound data is extracted from each target object.

Next, when the test data is generated, the processor 180 may collect object image data extracted from the image information, object sound data extracted from the sound source information, and object sensor data extracted from the sensor information and generate a test data set corresponding to each object by grouping at least one of the object image data, the object sound data, or the object sensor data, which is collected for each object.

Here, the processor 180 may classify the collected object image data for each device that acquires the image information, classify the collected object sound data for each device that acquires the sound source information, and classify the collected object sensor data for each device that acquires the sensor information.

In addition, when the object sound data is grouped for each object, the processor 180 may group the object sound data collected from the devices disposed around the object corresponding to the object image data.

For example, when the object image data is extracted from the image information, the processor 180 may estimate the position of the object corresponding to the object image data, acquire identification information about the devices disposed around the object with respect to the position of the object, and group the object sound data collected from the devices based on the identification information of the devices.

Here, when the position of the object is estimated, the processor 180 may collect the position information of each device from which the image information is acquired and estimate the position of the object based on the position of the devices.

For example, when the position of the object is estimated, the processor 180 may collect the position information of a first device from which the image information is acquired, primarily estimate a position of the object based on the position of the first device, collect position information of at least one second device disposed around the object based on the primarily estimated position of the object, and secondarily estimate a position of the object based on the position of the second device.

In addition, when the object sound data is grouped, if the object sound data is classified for each device, the processor 180 may extract the object sound data of a corresponding device based on the identification information of the devices and group the extracted object sound data.

In addition, when the object sensor data is grouped for each object, the processor 180 may group the object sensor data collected from the devices disposed around the object corresponding to the object image data.

That is, when the object image data is extracted from the image information, the processor 180 may estimate the position of the object corresponding to the object image data, acquire identification information about the devices disposed around the object with respect to the position of the object, and group the object sensor data collected from the devices based on the identification information of the devices.

Here, when the position of the object is estimated, the processor 180 may collect the position information of a device from which the image information is acquired and estimate the position of the object based on the position of the device.

For example, when the position of the object is estimated, the processor 180 may collect the position information of a first device from which the image information is acquired, estimate a position of the object based on the position of the first device, collect position information of at least one second device disposed around the object based on the primarily estimated position of the object, and secondarily estimate a position of the object based on the position of the second device.

In addition, when the object sensor data is grouped, if the object sensor data is classified for each device, the processor 180 may extract the object sensor data of the corresponding device based on the identification information of the devices and group the extracted object sensor data.

The processor 180 may generate a test data set including at least one of the object image data, the object sound data, and the object sensor data for each object.

When the sound source localization is estimated, the processor 180 may input the test data into the pre-trained artificial intelligence model so as to estimate the sound source localization and provide sound source localization estimation result information including a position, action, and moving direction of the target object.

Here, when the sound source localization estimation result information is provided, if the target object is provided in plurality, the processor 180 may provide sound source localization estimation result information including a position, action, and moving direction for each target object.

The processor 180 may analyze behavior of the target object in an indoor environment based on the sound source localization estimation result information and provide at least one of a control service of the devices disposed in the indoor space, a recommendation information service, or a notification information transmission service to an external server and an external terminal, which are preset, to correspond to an action of the target object.

For example, the processor 180 may provide a device control service that controls brightness of a lighting device disposed in a movement path of the target object when the action of the target object is a moving situation, provide a recommendation information service that informs a recommended exercise through video or sound through the device disposed around the target object, informs risk information and treatment information through a device disposed around the target object when the behavior of the target object is in a dangerous situation, and provide a notification information transmission service that transmits risk information to a preset contact through a communication device.

In addition, the processor 180 may input training data including at least one of the image information, the sound source information, or the sensor information, which is acquired from the plurality of devices disposed in the indoor space, into the artificial intelligence model to learn in advance.

Then, when the sound source localization estimation evaluation score is calculated, if the artificial intelligence model provides a sound source localization estimation result for the test data, the processor may calculate a sound source localization estimation evaluation score of the artificial intelligence model for each test data based on the sound source localization estimation result and match the sound source localization estimation evaluation score with the corresponding test data.

For example, when the sound source localization estimation evaluation score is calculated, the processor 180 may calculate the sound source localization estimation evaluation score based on a model performance evaluation method including at least one of an F1 score that is a harmonic average of the precision and the recall, or a confusion matrix.

In addition, when the sound source estimation evaluation score is calculated, the processor 180 may calculate a first sound source localization estimation evaluation score of the artificial intelligence model based on the sound source localization estimation result when the artificial intelligence model provides the sound source localization estimation result for the first test data, and match the first sound source location estimation evaluation score with the first test. The processor 180 may also calculate a second sound source location estimation evaluation score of the artificial intelligence model based on the sound source location estimation result when the artificial intelligence model provides the sound source location estimation result for the second test data, and match the second sound source location estimation evaluation score with the second test data.

When the test data is classified into validation data, if the sound source localization estimation evaluation score is calculated, the processor may determine whether the sound source localization estimation evaluation score is equal to or greater than a preset reference score, classify the test data corresponding to the sound source localization estimation evaluation score into the validation data if the sound source localization estimation evaluation score is equal to or greater than the preset reference score, and disregard the test data corresponding to the sound source localization estimation evaluation score if the sound source localization estimation evaluation score is less than the preset reference score.

In addition, when the artificial intelligence model is changed, the processor 180 may input the validation data into the artificial intelligence model to retrain the artificial intelligence model and change a portion of the artificial intelligence model.

Here, the processor 180 may input the validation data into the artificial intelligence model whenever test data is classified into validation data to change the artificial intelligence model.

Then, when the artificial intelligence model is updated, if the artificial intelligence model is changed, the processor 180 may input new test data into the changed artificial intelligence model to update the artificial intelligence model and estimate the sound source localization.

As described above, according to the present disclosure, the artificial intelligence model may be changed using validation data classified based on the sound source estimation evaluation score for each test data to update the changed artificial intelligence model to the test data, thereby continuously learning and updating the sound source localization estimation in response to various environmental changes and enhancing the sound source localization estimation performance.

In addition, the present disclosure may not be guaranteed in performance at only the specific environment, but may be evolved to be used in response to the changes in the environment.

In addition, the present disclosure may utilize life logging in the indoor space through location tracking and behavior analysis of a user and may recognize the user's situation and perform the actions.

Also, according to the present disclosure, when there are a plurality of speakers, a data preprocessing process may be performed to analyze the life patterns of each speaker, and the functions frequently used by each speaker may be recommended.

Figure 5:
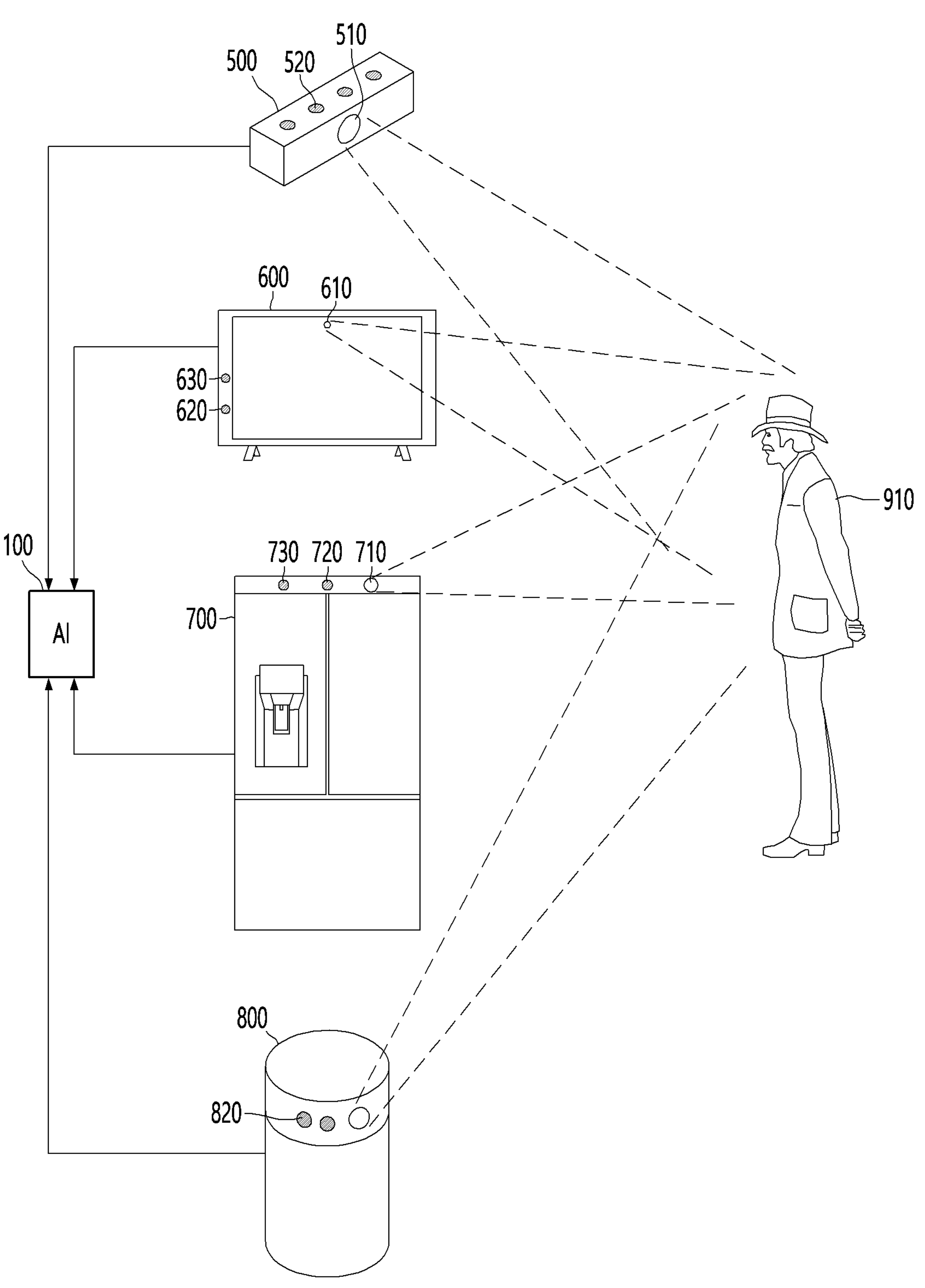
FIG. 5 is a view for explaining a process of acquiring information in the artificial intelligence apparatus according to an embodiment of the present disclosure.

FIG. 5 is a view for explaining a process of acquiring information in the artificial intelligence apparatus according to an embodiment of the present disclosure.

As illustrated in FIG. 5, an artificial intelligence apparatus 100 of the present disclosure is communicatively connected to a plurality of devices 500, 600, 700, and 800 disposed in an indoor space to acquire at least one of image information, sound source information, or sensor information from the plurality of devices 500, 600, 700, and 800.

The plurality of devices 500, 600, 700, and 800 may include at least one of cameras 510, 610, and 710 that acquire image information of an object 910 disposed in the indoor space, microphones 520, 620, 720, and 820 that acquire sound information of the object 910 disposed in the indoor space, or sensors 630 and 730 that acquire sensor information by sensing the object 910 disposed in the indoor space.

Here, the object 910 may include a subject or a speaker of a sound source that generates sound.

For example, the plurality of devices 500, 600, 700, and 800 may include home appliances including a monitoring device, a TV, a refrigerator, a robot cleaner, an air purifier, and the like.

Each of the devices 500, 600, 700, and 800 may include at least one of a camera, microphone, or sensor and also may acquire image information through the camera, acquire sound information through the microphone, and acquire sensor information through the sensor.

In addition, when each of the devices 500, 600, 700, and 800 acquires at least one of the image information, the sound information, or the sensor information, which corresponds to the object 910, the acquired information may be transmitted to the communicatively connected artificial intelligence apparatus 100.

Next, the artificial intelligence apparatus 100 of the present disclosure may estimate a sound source localization corresponding to the object 910 based on at least one of the image information, the sound source information, or the sensor information, which are acquired from the plurality of devices 500, 600, 700, and 800 to provide sound source localization estimation result information including a position, action, and moving direction of the object 910.

Here, the artificial intelligence apparatus 100 of the present disclosure may analyze behavior of the object 910 in an indoor environment based on the sound source localization estimation result information and provide at least one of a control service of the devices disposed in the indoor space, a recommendation information service, or a notification information transmission service to an external server and an external terminal, which are preset, to correspond to the action of the object 910.

Figure 6:
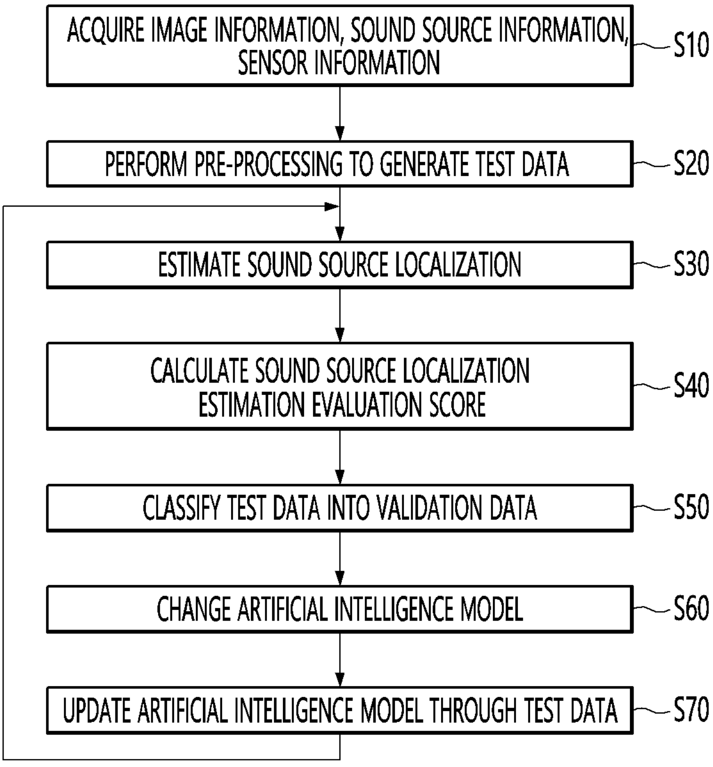
FIG. 6 is a view for explaining an operation of the artificial intelligence apparatus according to an embodiment of the present disclosure.

FIG. 6 is a view for explaining an operation of the artificial intelligence apparatus according to an embodiment of the present disclosure.

As illustrated in FIG. 6, in the present disclosure, at least one of image information, sound source information, or sensor information may be acquired from the plurality of devices disposed in the indoor space (S10).

In addition, in the present disclosure, at least one of the image information, the sound source information, or the sensor information may be pre-processed, and test data may be generated based on the image information, the sound source information, or the sensor information, which are pre-processed (S20).

Here, in the present disclosure, the pre-processing may be performed so that a target object is classified from the image information to extract object image data, perform pre-processing so that object sound data corresponding to the target object is extracted from the sound source information, and perform pre-processing so that object sensor data corresponding to the target object is extracted from the sensor information.

In addition, in the present disclosure, object image data extracted from the image information, object sound data extracted from the sound source information, and object sensor data extracted from the sensor information may be collected, and a test data set corresponding to each object may be generated by grouping at least one of the object image data, the object sound data, or the object sensor data, which is collected, for each object.

Next, in the present disclosure, the localization of the sound source may be estimated by inputting the test data into the pre-trained artificial intelligence model (S30).

Here, in the present disclosure, the test data may be inputted into the pre-trained artificial intelligence model to estimate the sound source localization and provide sound source localization estimation result information including a position, action, and moving direction of the target object.

In the present disclosure, behavior of the target object in an indoor environment may be analyzed based on the sound source localization estimation result information, and at least one of a control service of the devices disposed in the indoor space, a recommendation information service, or a notification information transmission service to an external server and an external terminal, which are preset, may be provided to correspond to an action of the target object.

In addition, in the present disclosure, a sound source localization estimation evaluation score of the artificial intelligence model for each test data may be calculated (S40).

Here, in the present disclosure, the sound source localization estimation evaluation score of the artificial intelligence model for each test data may be calculated based on the sound source localization estimation result to the sound source localization estimation evaluation score with the corresponding test data.

Further, in the present disclosure, the test data may be classified into validation data based on the calculated sound source localization estimation evaluation score (S50).

Here, in the present disclosure, when the sound source localization estimation evaluation score is calculated, and when the sound source localization estimation evaluation score is equal to or greater a the preset reference score, the test data corresponding to the sound source localization estimation evaluation score may be classified into validation data, and when the sound source localization estimation evaluation score is less than the preset reference score, the test data corresponding to the sound source localization estimation evaluation score may be disregarded.

Next, in the present disclosure, the artificial intelligence model may be changed based on the classified validation data (S60).

Here, in the present disclosure, the artificial intelligence model may retrained by inputting validation data into the artificial intelligence model to change a portion of the artificial intelligence model.

In addition, in the present disclosure, the changed artificial intelligence model may be updated by inputting the test data (S70).

Here, in the present disclosure, when the artificial intelligence model is changed, new test data may be inputted into the changed artificial intelligence model to update the artificial intelligence model and estimate the sound source localization.

In the present disclosure, test data having a high-level sound source localization estimation evaluation score may be classified into validation data based on the sound source localization estimation evaluation score for each test data, the artificial intelligence model may be changed through the classified validation data, and the performance of the artificial intelligence model may be continuously evolved because of responding even in various environmental changes.

For example, when a user moves to a new house or changes an indoor floor material, the artificial intelligence apparatus of the present disclosure may calculate the sound source localization estimation evaluation score of the artificial intelligence model for each test data to correspond to the indoor environment changes, classify the test data having a high-level sound source localization estimation evaluation score as validation data to change the artificial intelligence model through the classified verification data so as to be changed to the artificial intelligence model that adapts to a new indoor environment or a new floor material in a new house, and input the test data corresponding to the new indoor environment to update the artificial intelligence model.

In addition, in the present disclosure, life logging in the indoor space through the location tracking and the behavior analysis of the user may be utilized to recognize the user's situation and perform the actions.

Figure 7:
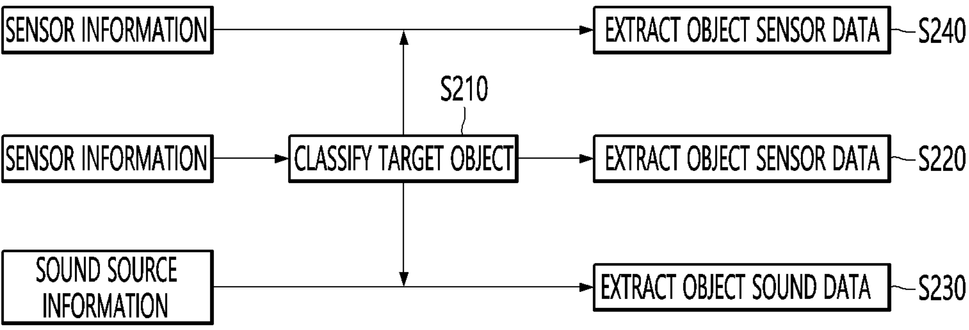
FIGS. 7 and 8 are views for explaining a process of extracting data in an artificial intelligence apparatus according to another embodiment of the present disclosure.
Figure 8:
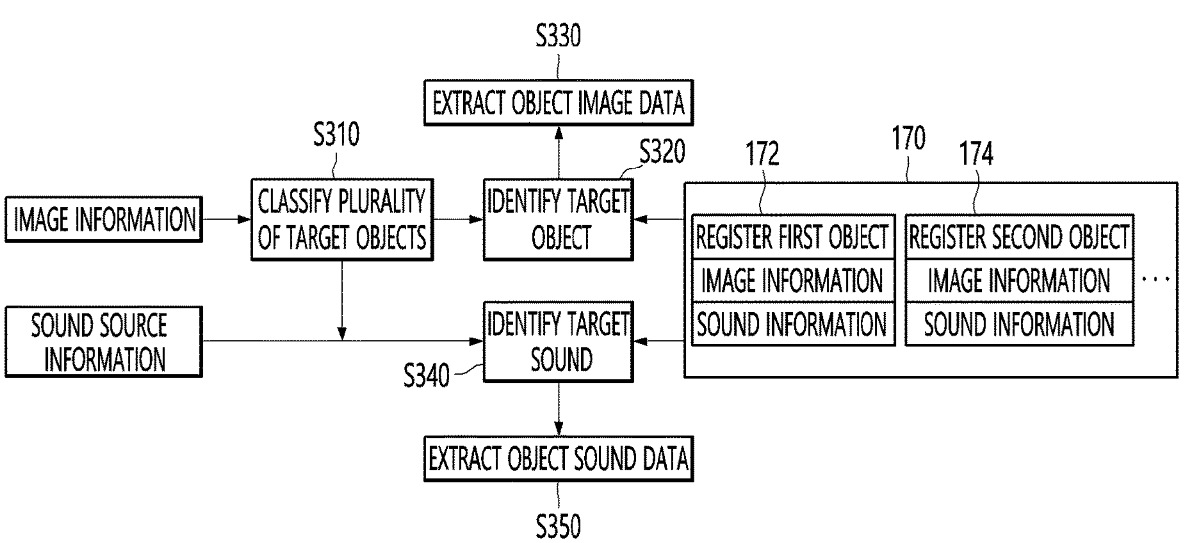

FIGS. 7 and 8 are views for explaining a process of extracting data in an artificial intelligence apparatus according to another embodiment of the present disclosure.

FIG. 7 is a view for explaining a data extraction process for one target object, and FIG. 8 is a view for explaining a data extraction process for a plurality of target objects.

As illustrated in FIG. 7, in the present disclosure, when image information is acquired from an indoor device, a target object may be classified from the image information (S210) and object image data may be extracted from the classified target object (S220).

In addition, in the present disclosure, when sound source information is acquired from the indoor device, object sound source data corresponding to the target object may be extracted from the sound source information (S230).

Next, according to the present disclosure, when the sensor information is acquired from the indoor device, object sensor data corresponding to the target object may be extracted from the sensor information (S240).

In addition, in the present disclosure, when the object image data for the target object is provided in plurality, the object image data may be classified for each device that acquires the image information, when the object sound data for the target object is provided in plurality, the object sound data may be classified for each device that acquires the sound source information, and when the object sensor data for the target object is provided in plurality, the object sensor data may be classified for each device that acquires the sensor information.

Thus, in the present disclosure, the object image data, the object sound data, and the object sensor data for the target object may be classified and stored for each device.

As another case, as in FIG. 8, in the present disclosure, when the image information is acquired from the indoor device, the target object may be classified from the image information (S310).

Here, in the present disclosure, when the target object classified from the image information is provided in plurality, the plurality of target objects may be identified based on the image information of the pre-registered object (S320), and object image data may be extracted for each target object (S330).

In addition, in the present disclosure, when the target object classified from the image information is provided in plurality, target sounds of the plurality of target objects may be identified based on sound information of the pre-registered object (S340), and object image data may be extracted for each target object (S350).

As illustrated in FIG. 8, in the present disclosure, image information and the sound information may be previously acquired for each user, and the previously acquired image information and sound information of the user may be previously registered.

As an example, in the present disclosure, the previously registered image information and sound information for each object (user) may be stored in the memory 170.

For example, the memory 170 may include first registered object information 172 and second registered object information 174 including at least one of image information or sound information.

FIGS. 9 and 10 are views for explaining a process of generating data in the artificial intelligence apparatus according to an embodiment of the present disclosure.

As illustrated in FIGS. 9 and 10, in the present disclosure, when test data is generated, object image data extracted from image information, object sound data extracted from sound source information, and object sensor data extracted from sensor information may be collected to generate a test data set corresponding to each object by grouping at least one of the object image data, the object sound data, or the object sensor data, which is collected for each object.

As illustrated in FIG. 9, in the present disclosure, at least one of object image data, object sound data, or object sensor data for a first object may be grouped to generate a first test data set 1110 corresponding to the first object.

In addition, in the present disclosure, at least one of object image data, object sound data, or object sensor data for a second object may be grouped to generate a second test data set 1120 corresponding to the second object.

In the present disclosure, at least one of object image data, object sound data, or object sensor data for a third object may be grouped to generate a third test data set 1130 for the third object.

In some cases, in the present disclosure, the collected object image data may be classified for each device that acquires the image information, the collected object sound data may be classified for each device that acquires the sound source information, and the collected object sensor data may be classified for each device that acquires the sensor information.

As illustrated in FIG. 10, in the present disclosure, at least one of the object image data, the object sound data, or the object sensor data for the first object may be classified for each device capable of acquiring the information and grouped to generate the first test data set 1110 corresponding to the first object.

In addition, in the present disclosure, at least one of the object image data, the object sound data, or the object sensor data for the second object may be classified for each device capable of acquiring the information and grouped to generate the first test data set 1120 corresponding to the second object.

In the present disclosure, at least one of the object image data, the object sound data, or the object sensor data for the third object may be classified for each device capable of acquiring the information and grouped to generate the first test data set 1130 for the third object.

For example, the first test data set 1110 may include object image data acquired from a first TV, object image data acquired from a second TV, object image data acquired from a refrigerator, object sound data acquired from the first TV, object sound data acquired from the second TV, object sound data acquired from an air purifier, and object sensor data acquired from a robot cleaner.

The second test data set 1120 may include object image data acquired from the second TV, object sound data acquired from the second TV, and object sound data acquired from the air purifier.

The third test data set 1130 may include object sound data acquired from the first TV, object sound data acquired from the second TV, object sound data acquired from the air purifier, and object sensor data acquired from the robot cleaner.

Figure 11:
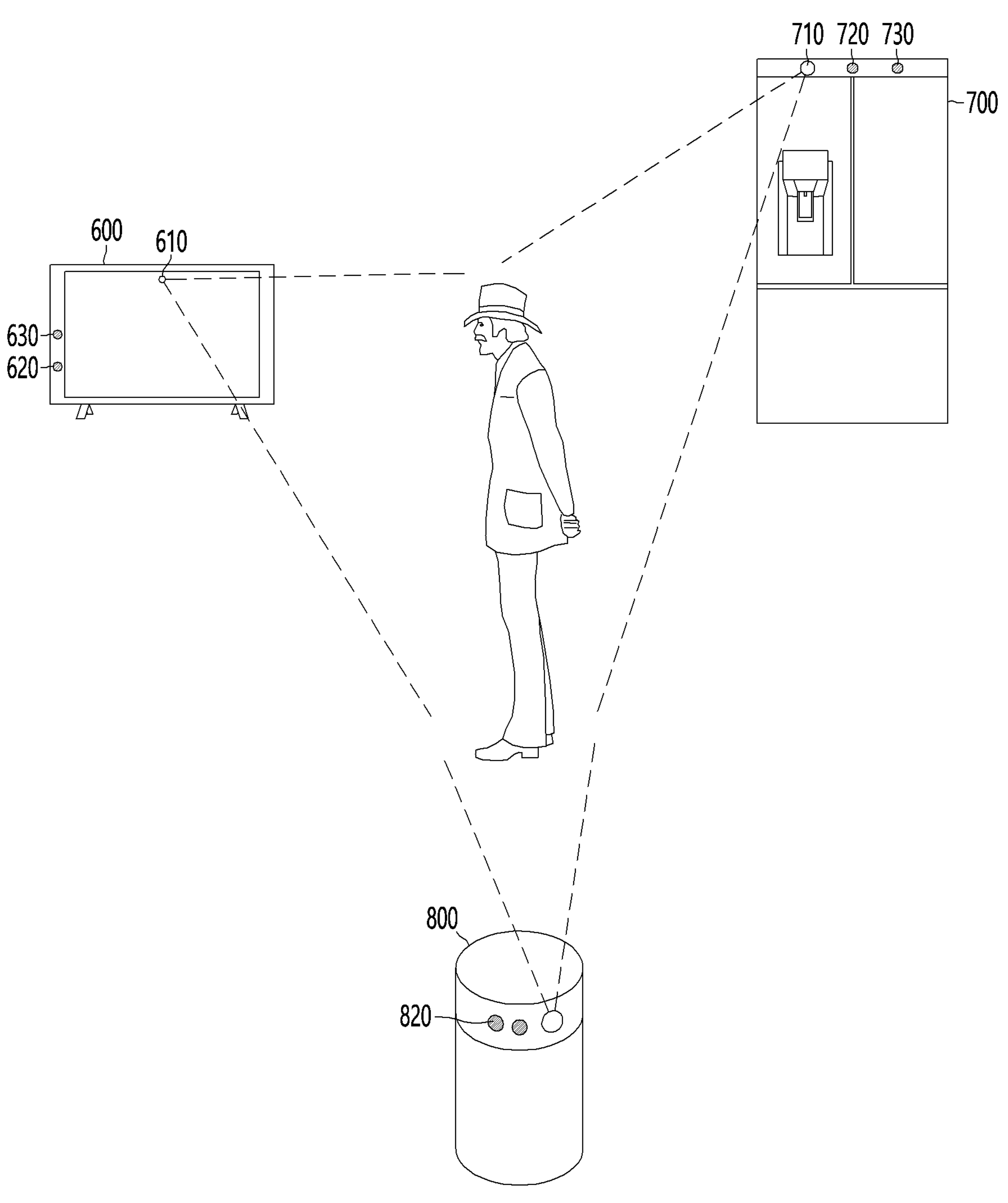
FIG. 11 is a view for explaining a process of grouping data in the artificial intelligence apparatus according to an embodiment of the present disclosure.

FIG. 11 is a view for explaining a process of grouping data in the artificial intelligence apparatus according to an embodiment of the present disclosure.

As illustrated in FIG. 11, in the present disclosure, test data may be generated by grouping the object sound data collected from devices 600, 700, and 800 capable of acquiring information and disposed around an object 910 corresponding to the object image data.

Here, in the present disclosure, when the object image data is extracted from the image information, a position of the object 910 corresponding to the object image data may be estimated, and identification information for the devices 600, 700, and 800 disposed around the object and capable of acquiring the information with respect to the position of the object 910 may be acquired to group object sound data collected from the corresponding devices 600, 700, and 800 based on the identification information of the devices 600, 700, and 800.

Here, in the present disclosure, when the position of the object 910 is estimated, position information of the device, which acquired the image information, may be collected, and the position of the object 910 may be estimated based on the position of the device.

For example, in the present disclosure, when the device 600 that acquires the image information through the camera 610 is a TV, position information of the TV device 600 may be collected to primarily estimate a position of the object 910 based on the position of the TV device 600, when the devices 700 and 800 disposed around the object 910 based on the primarily estimated position of the object 910 are a refrigerator and an air purifier, position information of the refrigerator device 700 may be collected to secondarily estimate a position of the object based on the position of the refrigerator device 700, and when position information of the air cleaner device 800 may be collected to tertiarily estimate a position of the object based on the air cleaner device 800.

In addition, in the present disclosure, when the device 700 that acquires the image information through the camera 710 is a refrigerator, position information of the refrigerator device 700 may be collected to primarily estimate a position of the object 910 based on the position of the refrigerator device 700, when the devices 600 and 800 disposed around the object 910 based on the primarily estimated position of the object 910 are a TV and an air purifier, position information of the TV device 600 may be collected to secondarily estimate a position of the object based on the position of the TV device 600, and when position information of the air cleaner device 800 may be collected to tertiarily estimate a position of the object based on the air cleaner device 800.

In addition, in the present disclosure, when the object sound data is grouped, if the object sound data is classified for each device, the object sound data of the corresponding device may be extracted based on the identification information of the devices to group the extracted object sound data.

For example, in the present disclosure, when the device 600 that acquires the sound information through the microphone 620 is a TV, identification information of the TV device 600 may be collected to extract object sound data of the TV device 600 based on the identification information of the TV device 600, when the device 700 acquires the sound information through the microphone 720 is a refrigerator, identification information of the refrigerator device 700 may be collected to extract object sound data of the refrigerator device 700 based on the identification information of the refrigerator device 700, when the device 800 that acquires the sound information through the microphone 820 is an air purifier, identification information of the air purifier device 800 may be collected to extract object sound data based on the identification information of the air purifier device 800, and the extracted object sound data of the TV device 600, the extracted object sound data of the refrigerator device 700, and the extracted object sound data of the air purifier device 800 may be grouped.

In some cases, in the present disclosure, when the object sensor data is grouped for each object, the object sensor data collected from the devices disposed around the object corresponding to the object image data may be grouped.

Here, in the present disclosure, when the object image data is extracted from the image information, the position of the object corresponding to the object image data may be estimated, the identification information about the devices disposed around the object with respect to the position of the object may be acquired, and the object sensor data collected from the devices based on the identification information of the devices may be grouped.

In addition, when the object sensor data is grouped, if the object sensor data is classified for each device, the object sensor data of the corresponding device may be extracted based on the identification information of the devices, and the extracted object sensor data may be grouped.

For example, in the present disclosure, when the device 600 that acquires the sensor information through the sensor 630 is a TV, identification information of the TV device 600 may be collected to extract object sensor data of the TV device 600 based on the identification information of the TV device 600, when the device 700 that acquires the sensor information through the sensor 730 is a refrigerator, identification information of the refrigerator device 700 may be collected to extract object sensor data of the refrigerator device 700 based on the identification information of the refrigerator device 700, and the extracted object sensor data of the TV device 600 and the extracted object sensor data of the refrigerator device 700 may be grouped.

Figure 12:
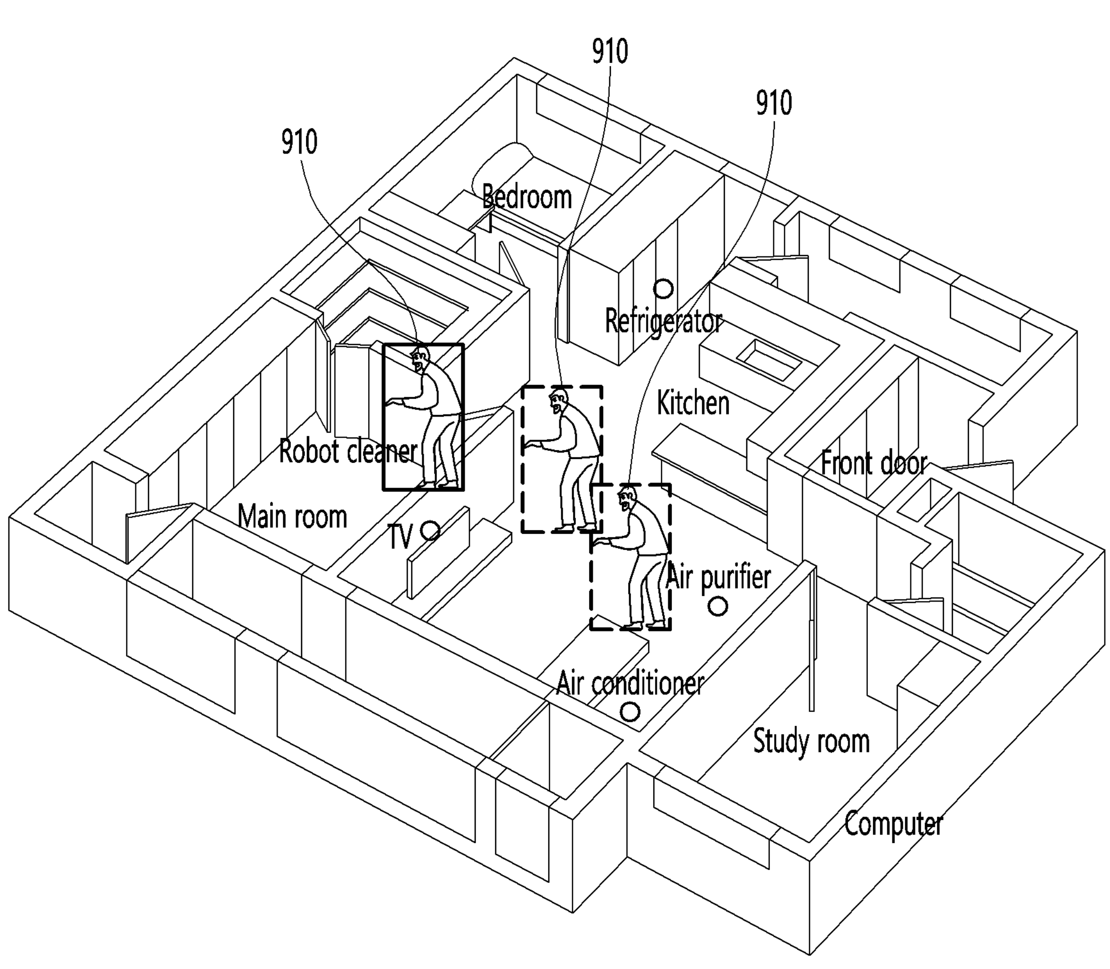
FIGS. 12 and 13 are views for explaining a process of providing a service for a sound source localization estimation result of the artificial intelligence apparatus according to an embodiment of the present disclosure.
Figure 13:
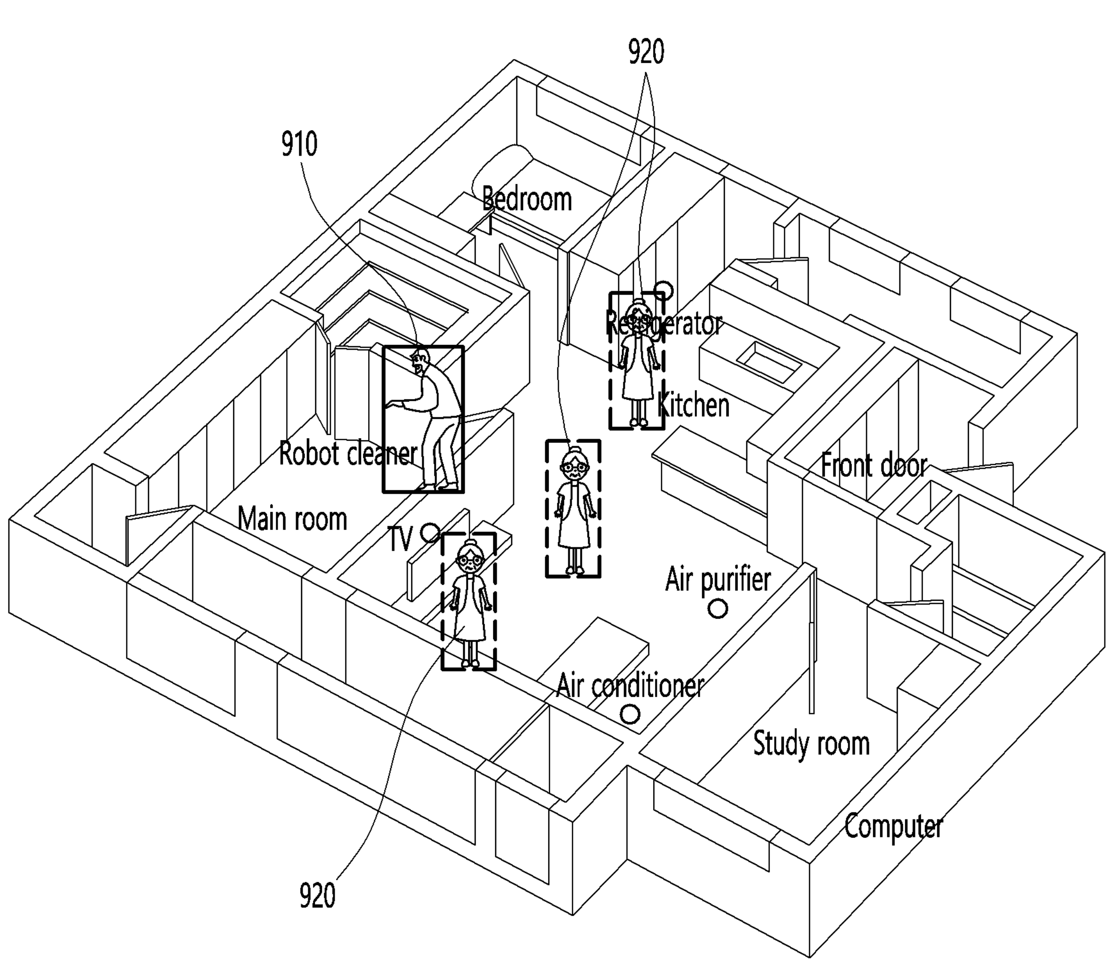

FIGS. 12 and 13 are views for explaining a process of providing a service for a sound source localization estimation result of the artificial intelligence apparatus according to an embodiment of the present disclosure.

As illustrated in FIG. 12, in the present disclosure, the sound source localization may be estimated by inputting test data into the pre-trained artificial intelligence model, and the sound source localization estimation result information including the position, action, and moving direction of the target object 910 may be provided.

Here, in the present disclosure, the training data including at least one of the image information, the sound source information, or the sensor information, which is acquired from the devices such as the TV, the air purifier, the air conditioner, the robot cleaner, and the computer disposed in the indoor space may be inputted into the artificial intelligence model to pre-train the artificial intelligence model.

In addition, in the present disclosure, behavior of the target object 910 in an indoor environment may be analyzed based on the sound source localization estimation result information, and at least one of a control service of the devices disposed in the indoor space, a recommendation information service, or a notification information transmission service to an external server and an external terminal, which are preset, may be provided to correspond to an action of the target object 910.

For example, as illustrated in FIG. 12, when an elderly person moves to a living room after being active in the living room, the artificial intelligence model of the present disclosure may receive the test data including at least one of the image information, the sound source information, or the sensor information from the devices such as the TV, the air purifier, the air conditioner disposed in the living room, and the robot cleaner disposed in the bedroom to identify the elderly person that is the target object 910, estimate the localization of the identified sound source, and provide the sound source localization estimation result information including the location, action, and moving direction of the elderly person.

In addition, in the present disclosure, if the action of the elderly person that is the target object is a moving action, a device control service that controls brightness of a lighting device disposed in a moving path of the elderly person may be provided. In another example, if the behavior of the elderly person that is the target object is an exercise action, a recommendation information service that notifies recommended exercise through video or sound through a device disposed around the elderly person may be provided. In yet another example, if the information of the elderly person that is the target object indicates that there is a dangerous situation, a notification information transmission service that notifies risk information and treatment information through a device disposed around the elderly person, and transmits risk information to a preset contact through a communication device may be provided.

In addition, as illustrated in FIG. 13, in the present disclosure, if a plurality of target objects 910 and 920 are provided, the sound source localization estimation result information may be provided for each target object 910 and 920, including the location, action, and moving direction of each target object.

In the present disclosure, the test data may be inputted into the pre-trained artificial intelligence model to estimate the sound source localization and provide the sound source localization estimation result information including the position, action, and moving direction of the target object.

In addition, in the present disclosure, the behavior of the target object in the indoor environment may be analyzed based on the sound source localization estimation result information to provide at least one of a control service of the devices disposed in the indoor space, a recommendation information service, or a notification information transmission service to an external server and an external terminal, which are preset, but this is merely an example, and thus, the present disclosure is not limited thereto.

For example, as illustrated in FIG. 13, when a first elderly person moves to a living room after being active in the living room, and a second elderly person is active in the living room, the artificial intelligence model of the present disclosure may receive the test data including at least one of image information, sound source information, or sensor information from the devices such as the TV, the air purifier, the air conditioner disposed in the living room, and the robot cleaner disposed in the bedroom to identify the first elderly person that is a first target object 910 and the second elderly person that is a second target object 920, estimate the localization of the sound source of the identified first and second elderly persons, and provide the sound source localization estimation result information including the location, action, and moving direction of the first and second elderly persons.

In addition, in the present disclosure, if the action of the first elderly person, which is the first target object 910, is a moving action, a device control service that controls brightness of a lighting device disposed in the moving path of the first elderly person may be provided, and if the action of the second elderly person, which is the second target object, is an exercise action, a recommendation information service that notifies the recommended exercise through video or sound through a device disposed around the second elderly person may be provided.

As described above, in the present disclosure, life logging of users in an indoor space may be utilized through location tracking and behavior analysis to recognize each user's situation and perform corresponding actions.

For example, the present disclosure may provide elderly care service that analyzes the user's behavior by utilizing the existing devices in the indoor space and detects situations such as a fall or collapse of a user, and may recognize various situations and serve various corresponding functions such as a security function, a fire situation recognition, an emergency situation recognition, and a detection of abnormal behavior of a child, or the like, in order to take corresponding actions.

Also, according to the present disclosure, when there are a plurality of speaking users, or speakers, the data preprocessing process may be performed to analyze the life patterns of each speaker, and the functions frequently used by each speaker may be recommended.

Figure 14:
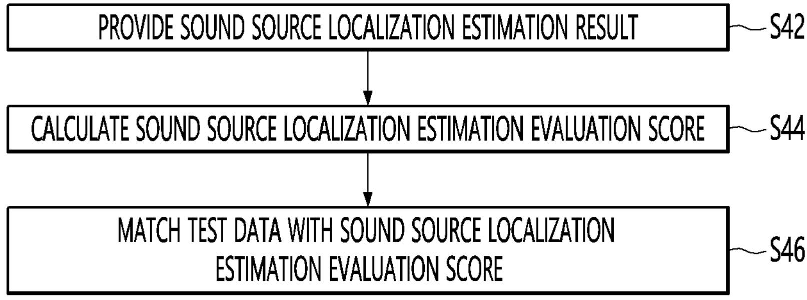
FIG. 14 is a view for explaining a process of calculating a sound source estimation evaluation score in the artificial intelligence apparatus according to an embodiment of the present disclosure.

FIG. 14 is a view for explaining a process of calculating a sound source estimation evaluation score in the artificial intelligence apparatus according to an embodiment of the present disclosure.

As illustrated in FIG. 14, in an embodiment, a sound source localization estimation result for test data may be provided (S42) through the artificial intelligence model.

Next, a sound source localization estimation evaluation score of the artificial intelligence model for each test data may be calculated based on the sound source localization estimation result (S44).

Here, in the present disclosure, a sound source localization estimation evaluation score may be calculated based on a model performance evaluation method including at least one of precision, recall, accuracy, an F1 score that is a harmonic average of the precision and the recall, and a fusion matrix. However these are merely examples, and the present disclosure is not limited thereto.

Next, the sound source localization estimation evaluation score and the corresponding test data may be matched with each other (S46).

For example, in an embodiment, when the artificial intelligence model provides a sound source localization estimation result for first test data, a first sound source localization estimation evaluation score of the artificial intelligence model may be calculated based on the sound source localization estimation result, and the first sound source localization estimation evaluation score may be matched with the first test data.

In addition, when the artificial intelligence model provides a sound source localization estimation result for second test data, a second sound source localization estimation evaluation score of the artificial intelligence model may be calculated based on the sound source localization estimation result, and the second sound source localization estimation evaluation score may be matched with the first test data.

Figure 15:
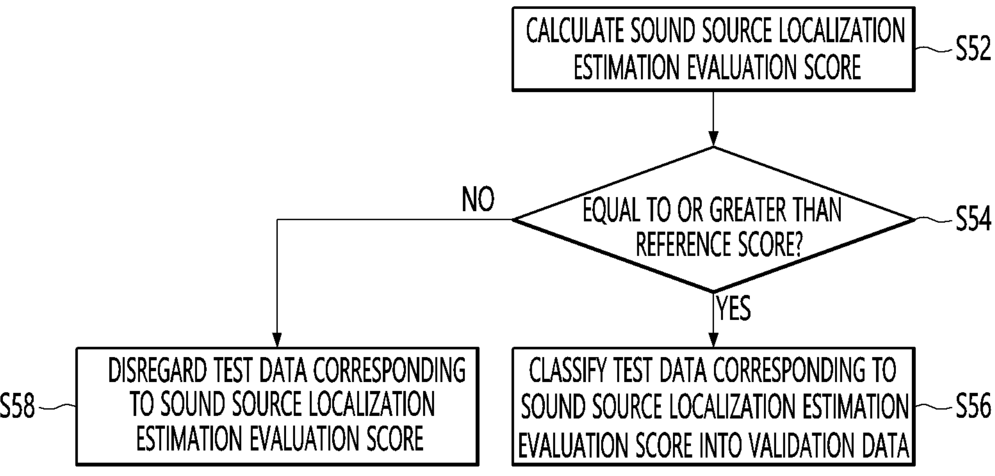
FIG. 15 is a view for explaining a process of classifying validation data in the artificial intelligence apparatus according to an embodiment of the present disclosure.

FIG. 15 is a view for explaining a process of classifying validation data in the artificial intelligence apparatus according to an embodiment of the present disclosure.

As illustrated in FIG. 15, in an embodiment, a sound source localization estimation evaluation score may be calculated for each test data (S52).

It is confirmed whether the sound source localization estimation evaluation score is equal to or greater than a preset reference score (S54).

Next, if the sound source localization evaluation score is equal to or greater than a preset reference score, test data corresponding to the sound source localization evaluation score may be classified into validation data (S56).

In addition, if the sound source localization evaluation score is less than the preset reference score, the test data corresponding to the sound source localization evaluation score may be disregarded (S58).

As described above, in the present disclosure, test data having a high-level sound source localization estimation evaluation score may be classified into validation data based on the sound source localization estimation evaluation score for each test data, and the artificial intelligence model may be changed through the classified validation data to continuously evolve the performance of the artificial intelligence model in order to respond even in various environmental changes.

For example, when a user moves to a new house or changes an indoor floor material, the artificial intelligence apparatus of the present disclosure may calculate the sound source localization estimation evaluation score of the artificial intelligence model for each test data to correspond to the indoor environment changes, classify the test data having a high-level sound source localization estimation evaluation score as validation data to change the artificial intelligence model through the classified verification data so as to be changed to the artificial intelligence model that adapts to a new indoor environment or a new floor material in a new house, and input the test data corresponding to the new indoor environment to update the artificial intelligence model.

Also, even when the user may be moving barefoot or wearing slippers, the artificial intelligence apparatus of the present disclosure may change and update the artificial intelligence model in response to the newly changed sound source information.

According to the embodiment of the present disclosure, the artificial intelligence apparatus may change the artificial intelligence model using the validation data classified based on the sound source estimation evaluation score for each test data to update the changed artificial intelligence model using the test data, thereby continuously learning and updating the sound source localization estimation in response to various environmental changes and enhancing the sound source localization estimation performance.

In addition, the present disclosure may not be guaranteed in performance at only the specific environment, but may be evolved to be used in response to the changes in the environment.

For example, embodiments of the present disclosure may also respond to the changes in the user's environment (moving, change of floor material, etc.).

In addition, embodiments of the present disclosure may utilize life logging in the indoor space through the location tracking and the behavior analysis of users and may recognize users' situation and perform corresponding actions.

For example, the present disclosure may provide elderly care service that analyzes a user's behavior by utilizing the existing devices in the indoor space and detect a user's fall or collapse, and may also recognize the various situations and perform various functions, such as a security function, a fire situation recognition function, an emergency situation recognition function, or detection of abnormal behavior of a child to take corresponding actions.

Also, according to the present disclosure, when there are a plurality of speaking users, or speakers, the data preprocessing process may be performed to analyze the life patterns of each speaker, and the functions frequently used by each speaker may be recommended.

The above-described present disclosure may be implemented as a computer-readable code on a computer-readable medium in which a program is stored. The computer readable recording medium includes all types of recording devices in which data readable by a computer system is stored. Examples of the computer-readable recording medium include hard disk drives (HDD), solid state disks (SSD), silicon disk drives (SDD), read only memories (ROMs), random access memories (RAMs), compact disc read only memories (CD-ROMs), magnetic tapes, floppy discs, and optical data storage devices. Also, the computer may include the processor 180 of the artificial intelligence server.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An artificial intelligence apparatus comprising:

a memory;

an input sensor; and a processor configured to:

receive input sensor information related to a target object via the input sensor;

obtain object data from the input sensor information;

group the object data to generate a grouped data set corresponding to the target object;

obtain a first estimate of a position of the target object based on the object data;

acquire identification information of at least one external device positioned around the target object at the first estimated position;

receive additional input sensor information related to the target object from the at least one external device positioned around the target object and extract additional object data from the additional input sensor information;

group the additional object data in the grouped data set corresponding to the target object; and obtain at least one additional estimate of the position of the target object based on the additional object data, wherein the processor is further configured to:

generate test data set comprising at least one of the object data or the additional object data;

input the test data into a pre-trained artificial intelligence model to estimate a sound source localization and provide a sound source localization estimation result information including a position, action, and moving direction of the target object;

calculate a sound source localization estimation evaluation score of the artificial intelligence model for the test data;

classify the test data into validation data based on the calculated sound source localization estimation evaluation score;

retrain the artificial intelligence model based on the validation data; and input the test data into the retrained artificial intelligence model to update the artificial intelligence model.

2. The artificial intelligence apparatus according to claim 1, wherein the input sensor is one of a plurality of input sensors configured to obtain at least image information, sound information, or sensor based information of the target object.

3. The artificial intelligence apparatus according to claim 2, wherein the processor is further configured to:

perform pre-processing so that object image data of the target object is extracted from the image information;

perform pre-processing so that object sound data corresponding to the target object is extracted from the sound information; and perform pre-processing so that object sensor data corresponding to the target object is extracted from the sensor based information.

4. The artificial intelligence apparatus according to claim 3, wherein the processor is further configured to:

generate a grouped data set for each of a plurality of target objects based on at least object image data, object sound data, or object sensor data extracted for each target object using image information, sound information, or sensor based information of each target object received from the plurality of input sensors.

5. The artificial intelligence apparatus according to claim 4, wherein a grouped data set for a particular target object comprises object sound data based on sound information of the particular target object received from a plurality of devices disposed around the particular target object, which corresponds to object image data of the particular target object grouped in the grouped data set.

6. The artificial intelligence apparatus according to claim 4, wherein a grouped data set for a particular target object comprises object sensor data based on sensor based information of the particular target object received from a plurality of devices disposed around the particular target object, which corresponds to object image data of the particular target object grouped in the grouped data set.

7. The artificial intelligence apparatus according to claim 4, wherein the processor is further configured to generate test data set comprising at least one of the object image data, the object sound data, or the object sensor data for each target object.

8. The artificial intelligence apparatus according to claim 1, wherein, based on there being a plurality of target objects, the processor is further configured to provide sound source localization estimation result information comprising a position, action, and moving direction of each target object.

9. The artificial intelligence apparatus according to claim 1, wherein the processor is further configured to:

analyze behavior of the target object in an indoor space based on the sound source localization estimation result information; and provide at least one of a control service of a device disposed in the indoor space, a recommendation information service, or a notification information transmission service to an external server and an external terminal corresponding to an action of the target object.

10. The artificial intelligence apparatus according to claim 1, wherein the processor is further configured to:

calculate the sound source localization estimation evaluation score of the artificial intelligence model for the test data based on the sound source localization estimation result; and match the sound source localization estimation evaluation score with the corresponding test data.

11. The artificial intelligence apparatus according to claim 1, wherein the processor is further configured to:

classify the test data into the validation data based on the sound source localization estimation evaluation score being equal to or greater than a preset reference score; and disregard the test data corresponding to the sound source localization estimation evaluation score based on the sound source localization estimation evaluation score being less than the preset reference score.

12. The artificial intelligence apparatus according to claim 1, wherein the processor is further configured to:

change the artificial intelligence model by inputting the validation data into the artificial intelligence model to retrain the artificial intelligence model.

13. The artificial intelligence apparatus according to claim 1, wherein the processor is further configured to update the artificial intelligence model by:

inputting new test data into the retrained artificial intelligence model to update the artificial intelligence model; and re-performing estimation of the sound source localization.

14. A method for estimating a sound source localization of an artificial intelligence apparatus, the method comprising:

receiving input sensor information related to a target object via the input sensor;

obtaining object data from the input sensor information;

grouping the object data to generate a grouped data set corresponding to the target object;

obtaining a first estimate of a position of the target object based on the object data;

acquiring identification information of at least one external device positioned around the target object at the first estimated position;

receiving additional input sensor information related to the target object from the at least one external device positioned around the target object and extract additional object data from the additional input sensor information;

grouping the additional object data in the grouped data set corresponding to the target object; and obtaining at least one additional estimate of the position of the target object based on the additional object data, the method further comprising:

generating test data set comprising at least one of the object data or the additional object data;

inputting the test data into a pre-trained artificial intelligence model to estimate a sound source localization and provide a sound source localization estimation result information including a position, action, and moving direction of the target object;

calculating a sound source localization estimation evaluation score of the artificial intelligence model for the test data;

classifying the test data into validation data based on the calculated sound source localization estimation evaluation score;

retraining the artificial intelligence model based on the validation data; and inputting the test data into the retrained artificial intelligence model to update the artificial intelligence model.

* * * * *